United States Patent [19]

Minton, Jr. et al.

[11] Patent Number: 5,289,859

[45] Date of Patent: Mar. 1, 1994

[54] VARIABLE WIDTH STUMP GRINDER

[76] Inventors: Jacob W. Minton, Jr., Rte. 6, Box 119C, Mountain Home, Ark. 72653; J. T. Barr, 1800 McArthur, Jonesboro, Ark. 72401

[21] Appl. No.: 59,302

[22] Filed: May 11, 1993

[51] Int. Cl.⁵ ............................................ A01G 23/06
[52] U.S. Cl. ................................. 144/2 N; 180/906; 280/638; 241/101.7; 254/199
[58] Field of Search ............... 241/101.7; 56/17.1; 83/928; 30/379, 379.5; 144/2 N, 34 R; 37/2 R; 280/638, 763.1, 766.1; 180/9.34, 9.48, 906

[56] References Cited

U.S. PATENT DOCUMENTS

| | | | |
|---|---|---|---|
| 3,154,164 | 10/1964 | Shaw et al. | 180/906 |
| 4,350,222 | 9/1982 | Luttere et al. | 180/906 |
| 4,402,352 | 9/1983 | Hodges | 144/2 N |
| 4,449,600 | 5/1984 | Telfer | 280/638 |
| 4,589,499 | 5/1986 | Behrens | 280/638 |
| 4,690,183 | 9/1987 | Emertson | 144/2 N |

*Primary Examiner*—W. Donald Bray
*Attorney, Agent, or Firm*—Stephen D. Carver; J. L. Mahurin

[57] ABSTRACT

A narrow profile, variable width stump grinder comprising a stump treatment tool adapted to forcibly grind a stump and a variable width carriage. The carriage comprises a rigid elongated frame and independently driven wheels coupled to the frame by extensible axles or struts. The frame comprises a longitudinal central member terminating in a header supporting the tool and a front tongue adapted to be coupled to a tow vehicle. The retractable struts are oriented generally perpendicularly to the longitudinal axis of the machine. The header comprises a housing defining parallel sleeves oriented perpendicularly to the axis to receive the struts. A hinged stand is pivotally secured to the top of the header to support the treatment tool in a raised position for transport. A linkage interconnecting the struts and a hydraulic cylinder deploys or retracts the struts to widen or narrow the grinder's stance. The linkage comprises an L-shaped crank pivoted to the frame. The major portion of the crank is pivotally coupled to a tie rod connected to the in-board end of the strut. The minor portion is pivotally coupled to the cylinder. Extension of the cylinder pivots the crank relative to the frame and retracts the strut. The linkage and cylinders nest against the frame when the struts are retracted presenting an overall narrow profile.

20 Claims, 5 Drawing Sheets

VARIABLE WIDTH STUMP GRINDER

BACKGROUND OF THE INVENTION

1. Field of the Invention

The present invention broadly relates to stump grinders. Specifically, the present invention is a Variable Width Stump Grinder with independently extensible axles. Representative prior art pertinent to motorized stump grinders is found in U.S. Patent Class 144, sub-2.

2. Prior Art

One of the most difficult and time consuming tasks associated with land clearing and tree removal is removal of the stumps. Stumps generally must be removed in order to render land useful for building, cultivation or for aesthetic reasons. Conventional approaches to stump removal are time consuming, costly and oftentimes dangerous. The stumps may be cut out by hand using axes and chain saws. Needless to say this approach is time consuming and hard on equipment. Heavy equipment may be used to dig stumps out or pull them up. This requires space and the use of a large piece of equipment such as a bulldozer. Blasting is a costly method of stump removal and often not practical in an urban setting. Additionally once the stump is removed a problem remains, what to do with it. Many landfills will not accept tree stumps. Burning on site might cause ecological problems and be prohibited by local laws or ordinances. Composting is not very practical from a time standpoint.

The art is replete with machines devised to comminute tree stumps in place. Some of these machines grind the stump away until it is below the surface of the surrounding soil. The devices, utilize a rotating cutting wheel, usually driven by an internal combustion engine.

Forslund, U.S. Pat. No. 4,069,846, discloses a device for eradicating tree stumps which employs a series of hydraulic cylinders and booms to pull apart an already split stump.

Various types of stump grinders or cutters have proven most effective for stump eradication. The prior art attempts share some common elements. Most devices include some form of elongated, rigid frame which rests on two or more wheels. A rotating, cutter blade is employed to engage and reduce the stump. The cutter may be actuated by remote hydraulic controls. Alternatively the cutters may be manually controlled and moved about by the operator.

A manual "push" stump remover is disclosed in U.S. Pat. No. 4,783,914, issued to Bowling Nov. 15, 1988. Another push unit is disclosed in Doskocil, U.S. Pat. No. 4,703,786. U.S. Pat. No. 3,123,112 issued Mar. 3, 1964, discloses a one man stump cutter in which a motor is disposed upon an elongated frame between front mounted wheels and a rear mounted stump cutter assembly.

U S. Pat. No. 3,783,914 discloses a "walk behind" self propelled stump cutter which includes a downwardly projecting cutter wheel disposed between the front support wheels and the rear handles. The latter patent is similar to Carlton, U.S. Pat. No. 3,336,958, issued Aug. 22, 1967. This patent discloses a one man machine in which a front mounted cutter wheel assembly is moved downwardly into engagement with a stump when an operator lifts up on the rear mounted handles. The drive wheels of the device provide the pivot point.

Other stump cutters are intended to be employed as an attachment. Bolton, U.S. Pat. No. 4,697,625, discloses a stump cutter which must be mounted to some other type of structure or frame In U.S. Pat. Nos. 4,180,107 and 4,041,996 Grover discloses stump eradicators intended to be attached to the boom of a crane or other heavy equipment.

Cutter tooth construction and deployment are discussed in McKenry, U.S. Pat. No. 4,214,617.

Various stump cutters intended to be towed into position are disclosed in various U.S. patents. A stump cutter employing a towable frame is illustrated in Smith, U.S. Pat. No. 4,744,396. Other examples of towable stump grinders are U.S. Pat. Nos. 4,271,879; 3,568,740; 4,074,447; RE 28,651; and 3,625,267. Some of the latter devices disclose stump cutting machines in which a variety of hydraulic and other complex linkages are provided for controlling the rotation cutter blade assembly.

On modern building sites many trees are left in place for environmental, ecological, and ascetic purposes. Therefore, it is often necessary to maneuver a stump grinder, capable of handling fairly large stumps, around trees, buildings and fences. Once in position it must be deployed around standing trees. Therefore, it is desirous to provide a stump grinder of a relatively large size which can easily be deployed in a "tight" situation. Such a stump grinder needs to have independently retractable and extensible axles.

Prior art stump cutters and grinders employ fixed axles. Various patents speaking to land vehicles disclose extensible axles such as U.S. Pat. No. 3,330,574 issued to Kulyk on Jul. 11, 1967. Wheels can be expanded forward and backward as seen in Smith, U.S. Pat. No. 4,948,155. U.S. Pat. Nos. 3,698,734 and 4,358,133 both show trailers having wheels that can be extended or contracted.

Hence, it is desirous to provide a stump grinder which may be easily towed behind a relatively small vehicle such as a van or pickup truck, but which has the ability to handle fairly large stumps. Therefore, it is desirous to provide a stump grinder which has an extensible base or stance to provide stability for a relatively large motor and grinding wheel during towing and operation. It is also disable that such a stump grinder also be capable of being deployed without the use of the tow vehicle in tight situations such as through the gates or around existing trees and buildings.

As a result, it is desirous to provide a stump grinder with a rigid frame and extensible axles to provide the necessary extended base. These axles should be independently extensible to facilitate use around existing trees and structures, avoiding damage thereto. Further, the stump grinder needs to be self propelled and capable of being maneuvered by a single individual. Finally, it is desirous that extension of the axles and operation of the grinder be controlled from a central location to facilitate one man use and coordinated use of the axles and the grinding wheel.

SUMMARY OF THE INVENTION

Our Variable Width Stump Grinder is capable of being deployed in tight situations. For example, the wheels may be retracted to maneuver the grinder between standing trees and buildings or through gates. The wheels may be extended to stabilize the unit for towing or to provide a wider stance while grinding a stump. To further facilitate use in a variety of situations, the wheels may be extended independently of one another. The preferred embodiment of our stump grinder is self-propelled to render the aforementioned innovations even more convenient.

The present invention is a stump grinder comprising a carriage mounting a cutting boom or wheel. The carriage is comprised of a frame mounting drive wheels on extensible struts extending from the frame. The unit can be maneuvered by a single individual from a central location near the front of the frame. The frame defines a header near its rear. The header receives the struts. A linkage connects the struts to a hydraulic cylinder. The motor which powers the cutter also drives a hydraulic pump. The pump provides fluid pressure to hydraulic systems controlling movement of the cutter, driving the wheels and extending or retracting the struts.

The frame is comprised of a longitudinal member coincident with the longitudinal axis of the grinder. An extensible tongue is secured to the front of the frame, adapting the unit for towing. The header at the rear of the frame comprises a pair of parallel sleeves oriented perpendicular to the longitudinal axis. Each sleeve receives a strut. The header also has a top plate over the sleeves and a bottom gusset under them.

A backing plate secured to the out-board end of each strut mounts a central spindle and bearing assembly on which each wheel is mounted. The sleeves are parallel, mounted one behind the other. Hence, it is necessary that the wheels be mounted offset from the center of the struts to allow the wheels to have a central axis of rotation. This latter axis is perpendicular to the longitudinal axis. In the preferred embodiment a hydraulic motor is secured to the backing plate. The motor is interconnected to the wheel by a chain and sprocket assembly.

The linkage connecting each strut to its hydraulic cylinder comprises an L-shaped crank connected to a tie rod. The vertex of the crank is pivoted to the frame. The shorter arm of crank is pinned to an eye in the end of the ram of the hydraulic cylinder. The long arm of crank is pinned to the out-board end of the tie rod. The in-board end of the tie rod is pivotally pinned to a boot spanning the in-board end of the strut.

A set of flanges pivotally mounts the cutting tool to the top of the header. A hinged two piece stand between the flanges can be folded out and upwardly to support the cutting boom in a raised position for transport and maneuvering. A dolly wheel with a tiller can be deployed at the front of the frame. This dolly wheel may be used to steer the unit.

The operation of each strut is similar. When the ram of the hydraulic cylinder extends the crank rotates around its vertex. In turn the tie rod is pulled away from the longitudinal axis. As a result, the strut slides in the sleeve perpendicular to the longitudinal axis. When the strut is fully withdrawn the tie rod nests parallel to the strut, and the cylinder nests against the frame. Therefore, a narrow profile is established with no components extending outwardly to catch on obstructions such as fence posts or standing trees.

When the machine is towed on the highway or is deployed, ready to begin comminuting a stump, the wheels are extended to provide a wider more stable stance. To extend a strut its cylinder is retracted. The crank rotates, displacing the tie rod, pulling the strut through the sleeve. The ram end of the cylinder moves away from the frame as nesting is no longer critical.

Therefore it is a primary object of the present invention to provide a Variable Width Stump Grinder.

More particularly, a primary object of the present invention is to provide a variable width stump grinder presenting a narrow profile when its axles are retracted.

A related object of the present invention is to provide a stump grinder in which the linkage used to deploy the axles nest against the central frame components of the grinder.

Another object of the present invention is to provide a stump grinder with independently extensible axles.

It is an object of the present stump grinder to facilitate use in cramped situations.

An object of the present invention is to provide a stump grinder which is capable of being moved independently of a tow vehicle through a gate.

A similar object of the present invention is to provide a stump grinder which is capable of moving between standing trees, buildings and fences.

It is an object of the present invention to provide a stump grinder in which the stance may be varied as necessary for a particular application.

A related object of the present invention is to provide a stump grinder in which one axle may be extended to allow maximum stability when eradicating a stump close to a standing tree or structure.

Specifically, a primary object of the present invention to provide a narrow profile, self propelled stump grinder with independently extensible axles.

An object of the present invention is to provide a stump grinder in which the stance may be widened for towing behind a vehicle.

An object of the present invention is to provide a self-propelled variable width stump grinder capable of being deployed and operated by a single individual.

A related object of the present invention to provide a stump grinder in which the controls are placed in a central location to facilitate one man use.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

With reference now to the accompanying drawings, the best mode of our Variable Width Stump Grinder is broadly designated by the reference numeral 15. It is comprised of a carriage 20 supporting a cutting tool 25. The carriage is comprised of a frame 30 supported by a pair of wheels 35, 37. The wheels are coupled to the frame by a pair of retractable struts 40, 42. The struts 40, 42 are received in a housing 50. The housing 50 is part of a header 60 defined on the rear 65 of the frame 30. A linkage 70 connects the struts 40, 42 to a hydraulic cylinder 75 which is anchored to the frame 30. An engine 80 provides power to the cutting tool 25 and to the hydraulic systems associated with the tool 25 as well as the cylinders 75. A control station 85 is positioned toward the front of the grinder 15. A dolly wheel 90 may be operatively employed toward the front 105 of the frame 30 to facilitate movement of the grinder about a job site.

Figure 1:
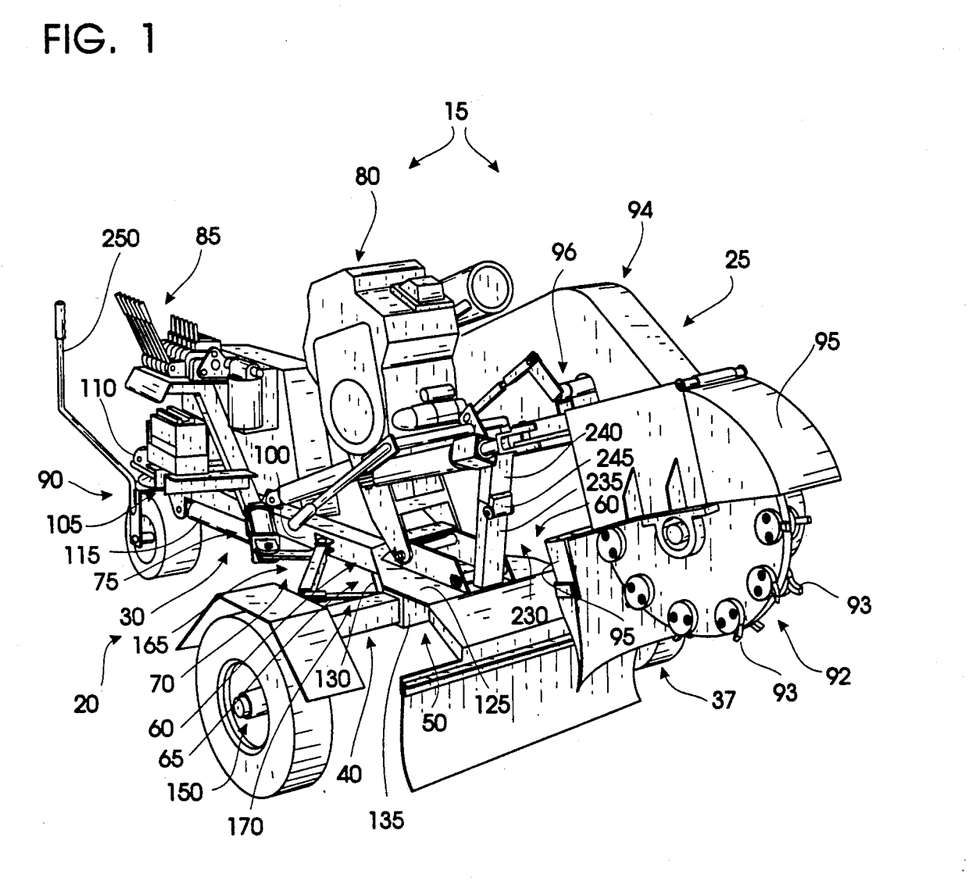
FIG. 1 is an environmental view of the preferred embodiment of our Variable Width Stump Grinder, with the cutting head raised and the dolly wheel deployed for movement about a job site.
Figure 2:
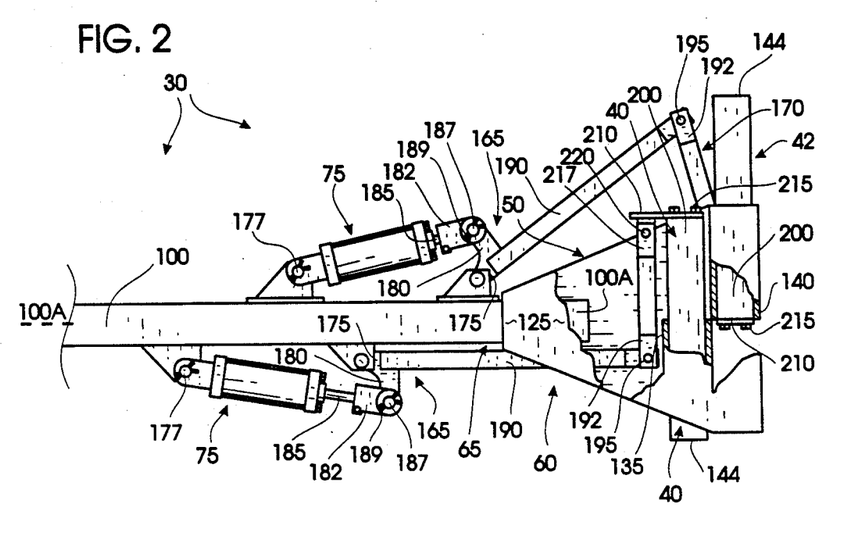
FIG. 2 is a fragmentary top plan view of the rear portion of the frame of the preferred embodiment with the right or rear strut partially extended, illustrating the deployment of the struts within the sleeves and the linkage connected thereto.

The cutting tool 25 mounted to the carriage 20 may be a stump cutting head as illustrated in FIG. 1. Such a cutting head is comprised of a cutting wheel 92 having a plurality of teeth 93. The wheel is mounted to a boom 94 with integral covers and guards 95. The cutting wheel 92 is driven by the engine 80. The cutting head generally employs some type of kick back or clutching mechanism 96.

The frame 30 is comprised of a longitudinal member 100, tongue 105 and a header 60. The longitudinal axis 100A of the frame 30 is defined through the center of the longitudinal member 100. The longitudinal member 100 is constructed from steel box tubing. The front 105 of the frame 30 terminates in a trailer tongue 110. The tongue 110 may be extended employing a hydraulic cylinder 115. The rear 65 of the frame 30 terminates in a header 60. The header 60 is comprised of a top plate 125 and a bottom gusset 130 with sleeves 135, 140 disposed therebetween. The area between the top plate 125 and the bottom gusset 130 defines the housing 50. Therefore, the housing 50 comprises the sleeves 135, 140 and the area around them. Each of the sleeves 135, 140 receives one of the struts 40, 42.

The struts 40, 42 are constructed of square tubing selected to be tightly received in the sleeves 135, 140. In the preferred embodiment strut 40 is received in the forward sleeve 135, and strut 42 is received in the rear sleeve 140. The sleeves 135, 140 are parallel but offset. Therefore, the wheels 35, 37 are mounted on the outboard ends 144 of the struts 40, 42 offset relative to the center of the strut. Thus, a central axis of rotation for the wheels 35, 37 is created, perpendicular to the longitudinal axis 100A of the frame 30.

Each wheel 35 or 37 has a backing plate 145 mounting a spindle and bearing assembly 150 on which the wheel 35, 37 is mounted. Preferably a hydraulic motor 155 is secured to the backing plate and drives the wheel 35, 37 via a chain and sprocket set.

Figure 3:
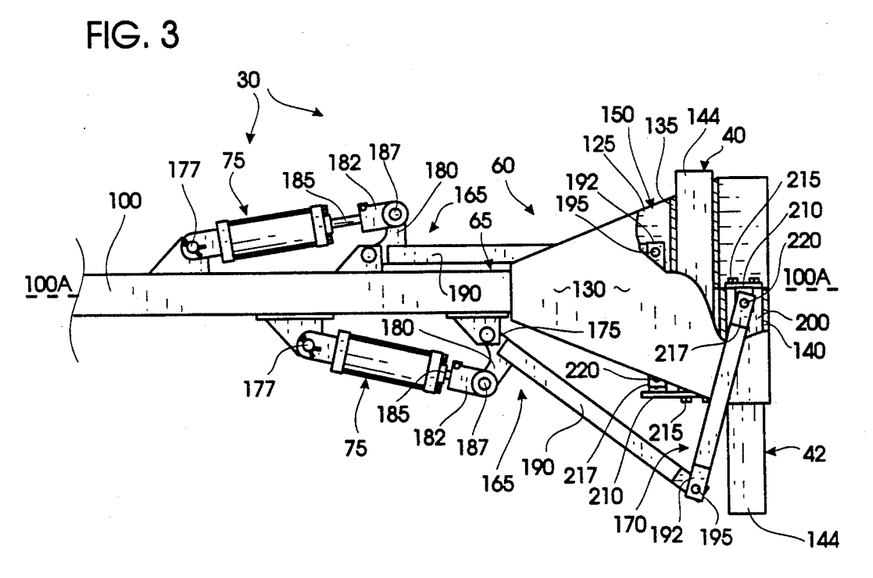
FIG. 3 is a fragmentary bottom plan view of the rear portion of the frame deployed similarly to FIG. 2.
Figure 4:
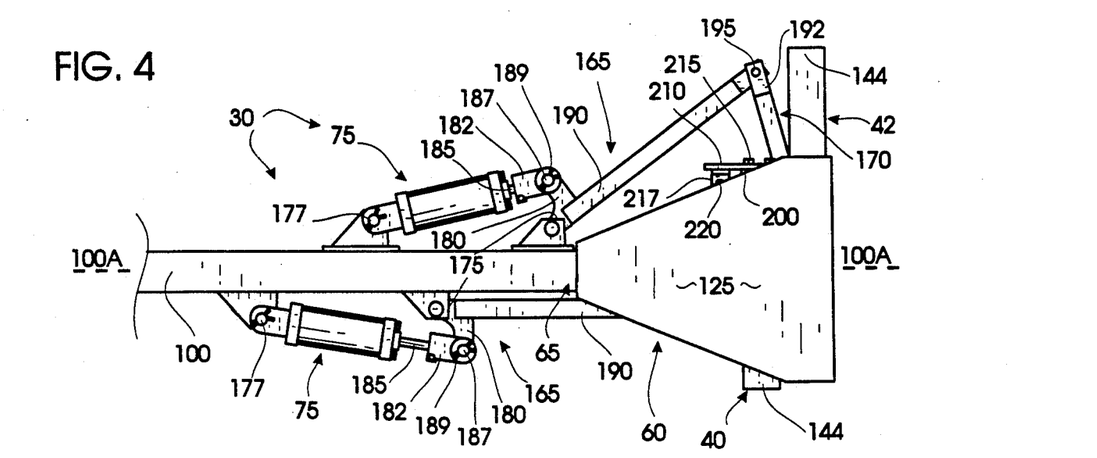
FIG. 4 is a fragmentary top plan view of the rear portion of the frame with the left or forward strut retracted and the right or rear strut extended.
Figure 5:
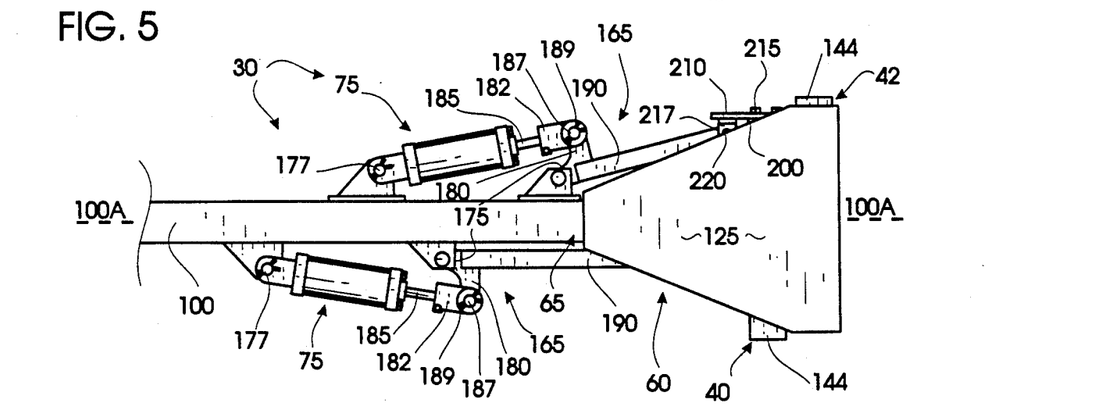
FIG. 5 is a fragmentary top plan view of the rear portion of the frame with both struts retracted.
Figure 6:
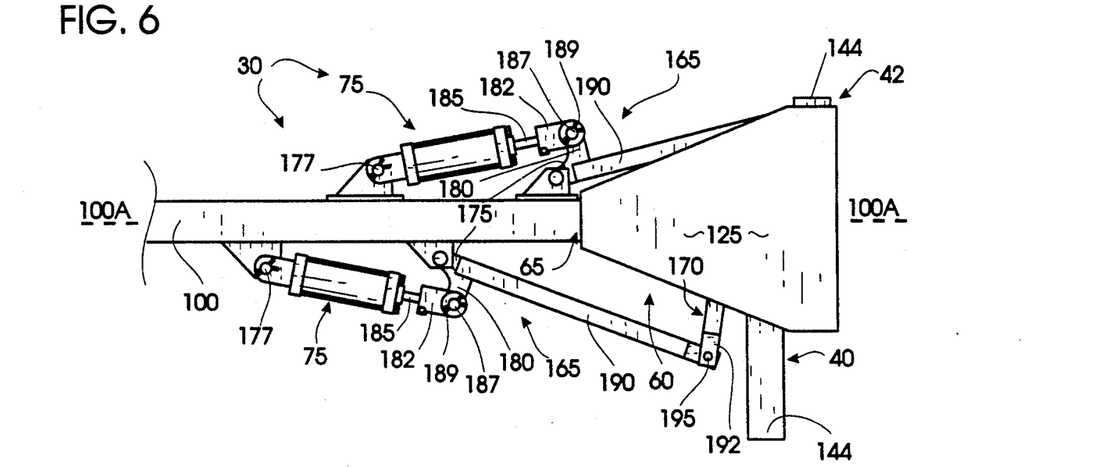
FIG. 6 is a fragmentary top plan view of the rear portion of the frame with the left strut extended and the right strut retracted.
Figure 7:
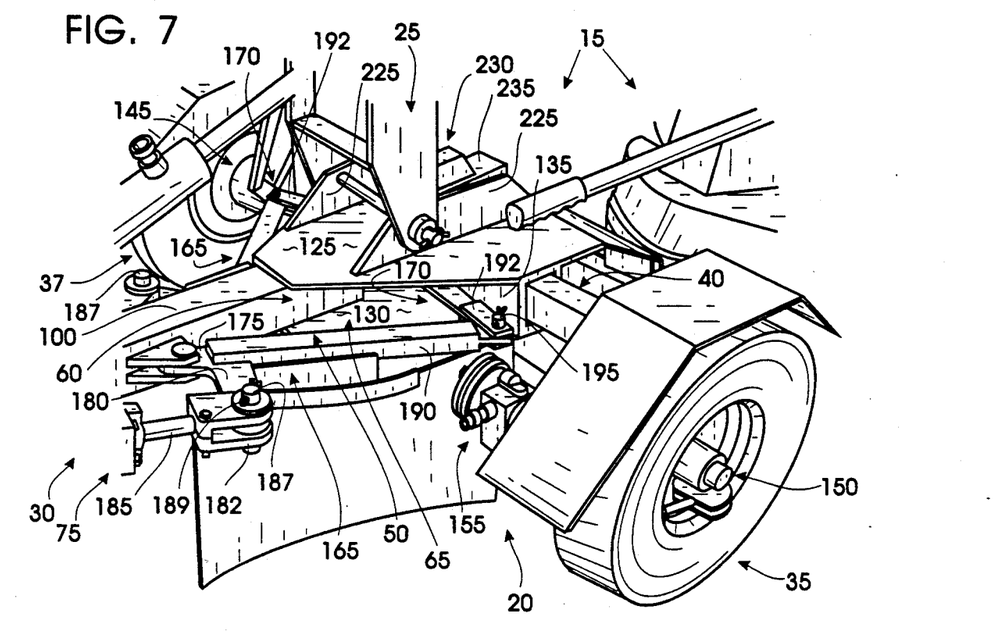
FIG. 7 is a partially fragmented left isometric view of the rear portion of the stump grinder with the left strut partially extended.
Figure 8:
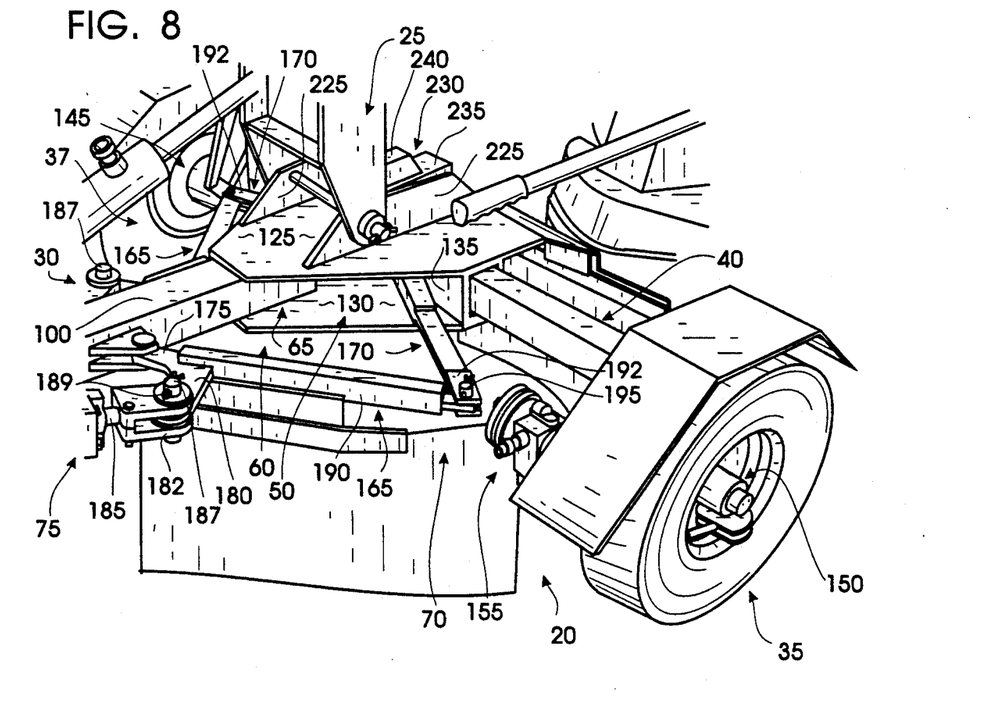
FIG. 8 is a partially fragmented left isometric view of the rear portion of the stump grinder with the left strut fully extended.
Figure 9:
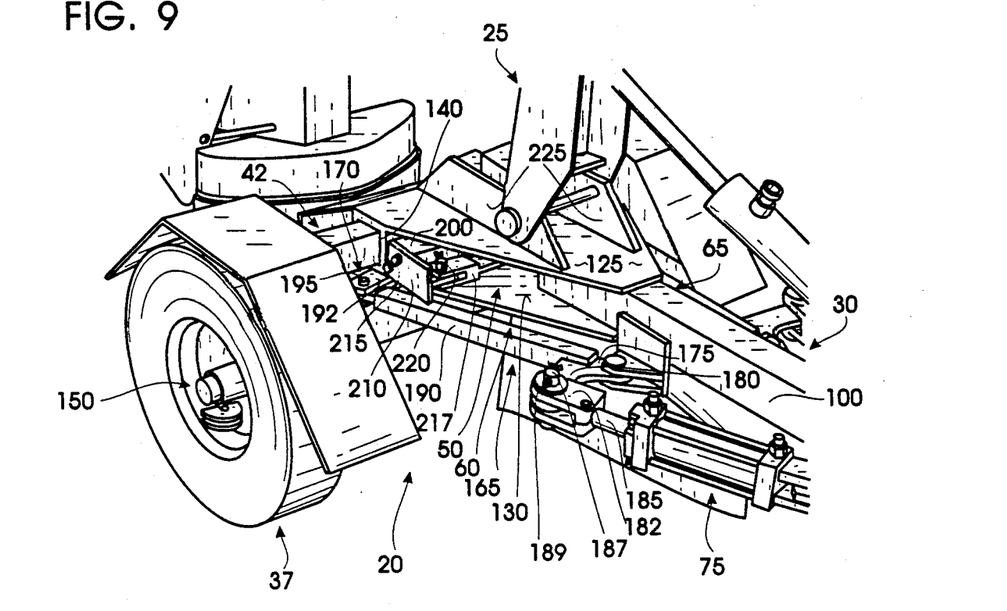
FIG. 9 is a partially fragmented right isometric view of the rear portion of the stump grinder with the right strut partially extended.
Figure 10:
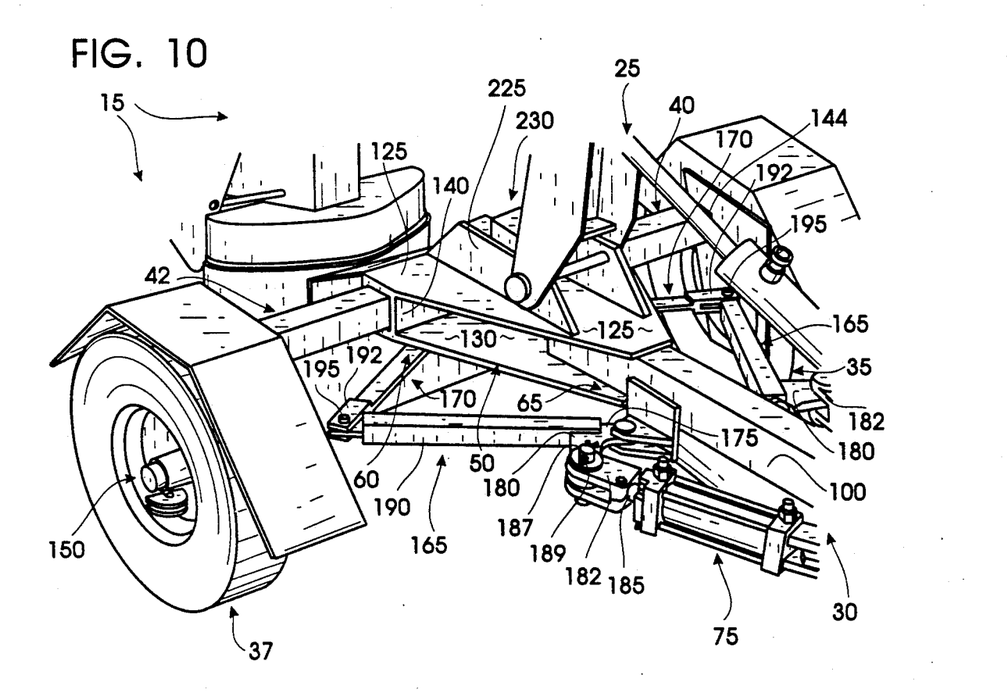
FIG. 10 is a partially fragmented right isometric view of the rear portion of the stump grinder with the right and left struts fully extended.

The linkage 70 is comprised of an L-shaped crank 165 and a tie rod 170. The L-shaped crank 165 is connected at its elbow or vertex 175 to the side of the longitudinal frame member 100. The shorter arm 180 of crank 165 extends from the vertex 175 to one of the hydraulic cylinders 75. The hydraulic cylinders 75 are secured to the longitudinal frame member 100 by a pin 177. The end of the short arm 180 is secured to the eye 182 on the ram 185 of the hydraulic cylinder 75 by a pin 187. Pin 187 is secured in place by a pair of cotter pins 189. The long arm 190 of crank 165 extends from the vertex 175 to the end of the tie rod 170. The end of the long arm 190 of the crank 165 is pivotally secured to the outboard end 192 of the tie rod 170 by pin 195. Tie rod 170 extends to the in-board end 200 of one strut. A boot 210 spans the in-board end 200 of each strut 40, 42 providing a stop 215 to adjust the degree of retracted travel of the strut. The boot 210 on the end of the forward strut 40 is oriented horizontally. The boot on the end of the rearward strut 42 is oriented vertically (FIG. 3). The in-board end 217 of the tie rod 170 is secured to the boot 210 by a second pin 220.

Two parallel, longitudinal flanges 225 extend upward from the top of the header 60. The flanges 225 pivotally mount the cutting tool 25 to the frame 30. In the preferred embodiment a two piece stand 230 is deployed between the flanges. A lower element 235 and an upper element 240 of the stand 230 are connected to each other by a hinge 245. The stand 230 can be folded out and upwardly to secure the cutting tool 25 in a raised position for transport and maneuvering.

OPERATION

The struts 40, 42, may be retracted or extended to displace the wheels 35, 37 in a narrower or wider stance. The wheels 35, 37 are retracted in order to facilitate deployment of the grinder 15 in a "tight" situation For example, the narrowed machine may pass through a gate or move between standing trees and buildings. The hydraulic controls at the control station 84 are employed to manipulate the hydraulic cylinders 75. Each strut 40, 42 and attached wheel assembly 35, 37 can be extended or retracted independently. The preferred embodiment is self propelled by hydraulic motors 155 at each wheel 35, 37. A dolly wheel 90 with a tiller 250 may be used to steer when moving the grinder 15.

The operation of each strut 40, 42 is similar. For clarity the operation of only one will be described in detail. Therefore, attention is now directed to the left or forward strut 40 and wheel 35 assembly as illustrated in FIG. 2 through 10. When the ram 185 of the hydraulic cylinder 75 is extended the connected crank 165 is rotated about its vertex 180, displacing the end of the long arm 190 toward the longitudinal axis 100A. This moves the tie rod 170 generally perpendicular to the longitudinal axis 100A. Since the tie rod 170 connects at its terminal end to the boot 210 of the strut 40, the strut 40 moves perpendicular to the longitudinal axis of the frame within the sleeve 135. When the strut 40 is fully withdrawn the tie rod 170 nests parallel to the strut 40 within the housing 50. Additionally, the cylinder 75 nests against the longitudinal member 100 of the frame 30. In other words, when fully extended the cylinder 75 is parallel to the longitudinal member 100 of the frame 30 and is positioned closely thereto. Nesting of the cylinder 75 and the tie rod 170 is necessary when the wheel 35 is in the fully retracted position to create a narrow profile. In other words, no components of the grinder 15 are extending outside the perimeter defined by the retracted wheels 35, 37 to catch on nearby obstructions.

As cylinder 75 is retracted the crank 165 is rotated about is vertex 180 displacing the tie rod 170 which in turn "pulls" the strut 40 through the sleeve 135. As a result the strut 40 is extended providing a wider base or stance for the grinder 15. As the strut 40 is extended and the cylinder 75 withdrawn the ram end of the cylinder 75 moves away from the longitudinal member 100 of the frame 30. Once in position and fully deployed the struts 40, 42 can be extended outward and clearance around the linkage 70 is not as critical. Furthermore, when the machine is towed on the highway the struts 40, 42 can be extended to provide a more stable stance.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A narrow profile implement carriage for supporting a motorized tool, said carriage comprising:
   rigid frame means for operatively mounting the tool, said frame means comprising a longitudinal axis;
   wheel means for supporting said frame means on opposite sides of said axis;
   retractable strut means oriented generally perpendicularly to said axis for operatively mounting said wheel means to said frame means;
   housing means associated with said frame means for receiving said strut means;
   linkage means for selectively deploying or retracting said strut means to widen or narrow the carriage; and,
   cylinder means secured to said frame means for selectively actuating said linkage means.

2. The implement as defined in claim 1 wherein said linkage means nests against said frame means when said strut means is retracted.

3. The implement as defined in claim 2 wherein said housing means comprises a pair of spaced apart, generally parallel sleeves oriented perpendicularly to said longitudinal axis.

4. The implement as defined in claim 1 wherein said linkage means comprises an L-shaped crank pivoted to said frame means, said crank having intersecting major and minor arms, the major arm pivotally coupled to said strut means, and the minor arm pivotally coupled to said cylinder means.

5. The implement as defined in claim 4 wherein extension of said cylinder means pivots said crank relative to said frame means and retracts said strut means, nesting said cylinder means against said frame means to maintain a narrow profile.

6. The implement as defined in claim 5 wherein extension of said cylinder means results in retraction of said strut means.

7. A narrow profile stump grinder comprising:
   a stump treatment tool adapted to forcibly grind a stump;
   a rigid elongated frame comprising a terminal header supporting said tool, a front tongue adapted to be coupled to a tow vehicle, a pair of sides, and a longitudinal axis extending between said header and said tongue;
   a wheel associated with each side of said frame for supporting said stump grinder;
   retractable struts oriented generally perpendicularly to said axis extending between each wheel and said header;
   a housing receiving said struts;
   a linkage system that deploys or retracts said struts to widen or narrow the stump grinder; and,
   a cylinder system secured to said frame for selectively actuating said linkage system.

8. The stump grinder as defined in claim 7 wherein said linkage system nests against said frame when said struts are retracted.

9. The stump grinder as defined in claim 8 wherein said housing is defined in said header, said housing comprising a pair of spaced apart, generally parallel sleeves oriented perpendicularly to said longitudinal axis.

10. The stump grinder as defined in claim 9 wherein said linkage system comprises an L-shaped crank pivoted to said frame, said crank having intersecting major and minor portions, the major portion pivotally coupled to said strut, and the minor portion pivotally coupled to said cylinder system.

11. The stump grinder as defined in claim 10 wherein extension of said cylinder system pivots said crank relative to said frame and retracts said strut, nesting said cylinder system against said frame to maintain a narrow profile.

12. The stump grinder as defined in claim 11 wherein extension of said cylinder system results in retraction of said strut.

13. The stump grinder as defined in claim 10 further comprising a tie rod having a first end pivotally coupled to said crank and a second end pivotally coupled to a boot disposed on an in-board end of said strut.

14. The stump grinder as defined in claim 13 wherein extension of said cylinder system pivots said crank relative to said frame and retracts said strut, nesting said cylinder system against said frame and nests said tie rod parallel to said strut within said header.

15. The stump grinder as defined in claim 9 wherein said header further comprises one or more supports pivotally secured to a top of said header to receive a pin secured to said treatment tool to index said tool relative to said longitudinal axis.

16. A variable width, self propelled stump grinder comprising:
   rigid frame means for coupling said grinder to a tow vehicle, said frame means comprising a front, a rear and a longitudinal axis;
   drive wheel means rotatably coupled to said frame means for propelling and supporting said grinder;
   extensible axle means for displaceably coupling said drive wheel means to said frame means perpendicular to said longitudinal axis;

cutter means extending outwardly from the rear of said grinder for engaging and grinding a stump; and, motor means secured to said frame means for powering to said drive wheel means, axle means and cutter means.

17. The stump grinder as defined in claim 16 wherein said extensible axle means comprises:

a housing defined at the rear of said frame, said housing comprising a forward sleeve and a rearward parallel sleeve, said sleeves oriented perpendicularly to said longitudinal axis;

a pair of struts, each partially, coaxially received by one of said sleeves, said drive wheel means rotatably secured to an out-board end of each of said struts;

a pair of extensible hydraulic cylinders secured to said frame means; and, a linkage extending from each of said cylinders to one of said struts, said linkage translating movement of said cylinder into extension or retraction of said strut perpendicular to said longitudinal axis.

18. The stump grinder as defined in claim 17 wherein each of said linkages comprises;

an elongated L-shaped crank pivotally secured to said frame means, a first end of said crank pivotally secured to one of said cylinders; and, a tie rod pivotally connecting a second end of said crank and an in-board end of one of said struts;

whereby, extension and retraction of said cylinder pivots said crank relative to said frame means, displacing said tie rod, resulting in retraction or extension of said strut perpendicular to said longitudinal axis.

19. The stump grinder as defined in claim 18 wherein said drive wheel means comprises:

a tire and wheel combination rotatably offset mounted to the out-board end of each of said struts, said wheels sharing a common axis of rotation perpendicular to said longitudinal axis; and, hydraulic motors powered by said motor means operatively linked to each of said wheels.

20. The stump grinder as defined in claim 18 wherein extension of each of said cylinders results in retraction of each of said struts and retraction of each of said cylinders results in extension of each of said struts.

* * * * *